No. 632,856.  
S. SWEENEY.  
ICE CREAM FREEZER.  
(Application filed Feb. 10, 1899.)  
Patented Sept. 12, 1899.

(No Model.)

Witnesses  
M. McGinnis  
Wm Cord

Inventor  
Samuel Sweeney  
By Hazard & Harpham  
Attorneys

UNITED STATES PATENT OFFICE.

SAMUEL SWEENEY, OF LOS ANGELES, CALIFORNIA.

ICE-CREAM FREEZER.

SPECIFICATION forming part of Letters Patent No. 632,856, dated September 12, 1899.

Application filed February 10, 1899. Serial No. 705,204. (No model.)

*To all whom it may concern:*

Be it known that I, SAMUEL SWEENEY, a citizen of the United States, residing in the city of Los Angeles, in the county of Los Angeles, State of California, have invented a new and useful Improvement in Ice-Cream Freezers, of which the following is a specification.

My invention relates to that class of freezers in which the freezing mixture is placed within a revoluble cylinder and the cream is frozen on the periphery thereof; and the object thereof is to provide mechanism to supply the cream to the freezing-cylinder in such manner as to render the cream smooth and to remedy certain defects in the manner of closing the freezing-cylinder to prevent its leaking.

In the accompanying drawings, Figure 1 is an end view of my freezer with parts of the case and pans cut away. Fig. 2 is a plan view with the top and cover removed. Fig. 3 is a detail view of the mechanism of the packing end of the freezing-cylinder.

1 is the outside box, having a hinged cover 2. 3 is the freezing-cylinder, having on one end a large hollow neck 4, through which the freezing mixture is introduced into the cylinder. The mouth of the neck is provided with a projecting flange 5, the lower side of which consists of two inclined planes forming screw-threads. This flange is cut by four notches, two on each side, only those on the upper side, 6 and 7, being shown in the drawings. 8 is a cap or cover which projects within and fits the neck 4 closely. This cover has lugs 9, which fit in notch 6 of the neck and the corresponding notch on the other side to prevent the cover from turning on the neck. It also has a trunnion or shaft 10. 11 is a ring, of rubber or other packing, placed between cap 8 and neck 4 to make a water-tight joint. Cap 8 is fastened to neck 4 by a clamp 12, the ends of which engage with the flange 5 of the neck, which as it is rotated draws the cap and neck tight on the packing, and thus makes a water-tight joint. On the other end of cylinder 3 is mounted a small trunnion or shaft 13 and a gear 14. Gear 14 meshes with cog 15, affixed to shaft 16, which is rotatively mounted in box 1, which meshes with cog 25, mounted on shaft 22. On shaft 16 is attached a handle 17 to impart motion to the moving parts.

18 is a pan to hold the milk while it is being brought into the best condition to be frozen, which is accomplished by agitator 19, mounted on shaft 20, and agitator 21, mounted on shaft 22. Shaft 22 is rotatively mounted in bearings on pan 18, one end projecting through the end of the pan 18, on which is mounted cog 25. Within the pan 18 is mounted on shaft 22 cog 24, which meshes with cog 23, mounted on shaft 20. Pan 26 is the receptacle for holding the milk that is ready for freezing and has bearings 27 on the bottom thereof, which rest on support 28, attached to the bottom of box 1. Pans 18 and 26 are attached together and connected by a valve-controlled aperture 29.

30 is a valve mounted on the side of pan 18, by means of which aperture 29 is controlled, and has an elastic stem 31.

32 is a roller rotatively mounted in the pan 26, by the revolution of which the milk is brought in contact with the periphery of the freezing-cylinder.

33 is a scraper having flexible handle 34, which removes the frozen cream from the freezing-cylinder 3 and causes it to fall into receptacle 35. This scraper can be adjusted to have different degrees of pressure by its handle, which engages with the toothed sector 36, attached to box 1. Receptacle 35 is provided with lugs 37 and 38 on its sides, which have holes therein, one for the reception of pin 40, affixed to the pan 46, and the other for the reception of the point 41 of spring 42, which is attached to pan 46. The object of spring 42 is to permit the cream-receptacle to be removed from the machine for cleaning or emptying its contents more easily. The space between the pan 46 and the receptacle 35 may be packed with ice to keep the cream from melting, in which case, when the ice melts, the spring 42 and pin 40 keep the receptacle from floating out of place.

I am aware that machines of a similar character have been patented, notably to Bellamy on February 2, 1892; but in such machines the trouble has been that the orifice through which the freezing material was introduced into the cylinder could not be made tight, and the leaking spoiled the cream. This I avoid, as the cap which covers the neck of the cylinder does not rotate on the packing to rumple it up and cause it to leak. Another objection to those machines was because the milk was not properly agitated before it was brought in contact with the freezing-cylinder. I obviate this objection by having a separate receptacle for the milk, in which the agitators beat it up to a proper condition before it is allowed to come in contact with the freezing-cylinder, and then allowing it to pass through a valve-controlled aperture in a flow just sufficient to be taken up by the freezing-cylinder.

My freezer is operated as follows: The proper mixture to make ice-cream is placed in the pan 18, and it is beaten up by the agitators therein to a proper consistency to make smooth cream. The freezing-cylinder is properly packed and put in place and the valve 30 opened, so as to allow as much of the mixture to flow into pan 26 as can be readily frozen by cylinder 3. Cylinder 3 bears against roller 32, which causes it to rotate and bring the cream up in contact with cylinder 3, where it is frozen and scraped off into receptacle 35. It will be observed that gear 15 turns both the freezing-cylinder and the gear which operate the agitators in pan 18, thereby keeping the cream agitated while it is being fed from pan 18 into pan 26, where it is fed to the freezing-cylinder by roll 32.

Having thus described my invention, what I claim as new is—

An ice-cream freezer composed of the box 1 having cover 2; freezing-cylinder 3 rotatively mounted in bearings in box 1; gear 14 on cylinder 3; shaft 16 rotatively mounted in box 1; cog 15 affixed to shaft 16; pan 18 attached to pan 26; shaft 20 having affixed thereto agitator 19 and cog 23; shaft 22 having affixed thereto agitator 21, and cogs 24 and 25; said shafts 20 and 22 being mounted in bearings in pan 18; pan 26 having bearings 27 resting on support 28; support 28 attached to box 1; aperture 29 connecting pans 18 and 26; valve 30 mounted on pan 18 and having stem 31 whereby valve 30 is operated, roller 32 in pan 26; scraper 33 having handle 34; and cream-receptacle 35, substantially as described herein.

In witness that I claim the foregoing I have hereunto subscribed my name, this 14th day of January, 1899, at Los Angeles, California.

SAMUEL SWEENEY.

Witnesses:
G. E. HARPHAM,
N. W. THOMPSON.